United States Patent
Thompson

(10) Patent No.: US 9,908,695 B1
(45) Date of Patent: Mar. 6, 2018

(54) AUTONOMOUS GARBAGE CAN CART

(71) Applicant: John Thompson, Colonia, NJ (US)

(72) Inventor: John Thompson, Colonia, NJ (US)

(*) Notice: Subject to any disclaimer, the term of this patent is extended or adjusted under 35 U.S.C. 154(b) by 74 days.

(21) Appl. No.: 15/044,326

(22) Filed: Feb. 16, 2016

(51) Int. Cl.
| *B62B 3/04* | (2006.01) |
| *B60K 1/02* | (2006.01) |
| *B65F 1/14* | (2006.01) |
| *B60L 11/18* | (2006.01) |
| *G05D 1/00* | (2006.01) |
| *G05D 1/02* | (2006.01) |

(52) U.S. Cl.
CPC ............ *B65F 1/1468* (2013.01); *B60L 11/18* (2013.01); *G05D 1/0011* (2013.01); *G05D 1/021* (2013.01)

(58) Field of Classification Search
CPC .... B60K 2007/0084; B60K 2007/0069; B60K 7/0007; B60K 7/00; B60K 1/02; B60K 1/00
See application file for complete search history.

(56) References Cited

U.S. PATENT DOCUMENTS

| 2,667,320 | A | * | 1/1954 | Whitley | ................ | B65F 1/1468 |
| | | | | | | 248/129 |
| 4,807,716 | A | * | 2/1989 | Hawkins | ................. | B60K 1/02 |
| | | | | | | 180/65.1 |
| 5,042,642 | A | | 8/1991 | Ullrich | | |
| 5,096,049 | A | | 3/1992 | Anderson | | |
| 5,110,147 | A | * | 5/1992 | Gershman | ................ | B60D 1/00 |
| | | | | | | 248/907 |
| 5,353,887 | A | | 10/1994 | Putnam | | |
| 6,237,503 | B1 | | 5/2001 | Kollbeck | | |
| RE37,350 | E | * | 9/2001 | Stephan | ................ | B62B 5/0083 |
| | | | | | | 280/79.11 |
| D477,900 | S | * | 7/2003 | Ditmars, Jr. | .................... | D34/12 |
| 6,695,325 | B2 | * | 2/2004 | Carrillo | ................... | B62B 3/008 |
| | | | | | | 280/47.16 |
| D532,176 | S | * | 11/2006 | Ditmars, Jr. | .................... | D34/21 |
| 7,578,511 | B2 | * | 8/2009 | Sheehan | ............... | B65F 1/1468 |
| | | | | | | 280/47.34 |
| 7,661,685 | B2 | * | 2/2010 | Thibault | .................. | B25H 3/00 |
| | | | | | | 280/47.35 |
| 8,146,695 | B1 | | 4/2012 | Ramshur | | |

(Continued)

FOREIGN PATENT DOCUMENTS

CA       2555947 A1    7/2015

*Primary Examiner* — James A Shriver, II
*Assistant Examiner* — Vaughn T Coolman
(74) *Attorney, Agent, or Firm* — Kyle A. Fletcher, Esq.

(57) ABSTRACT

The autonomous garbage can cart is a remotely operated motorized cart that transports garbage receptacles. The autonomous garbage can cart comprises a platform that is formed with a cavity that is sized to receive garbage receptacles. The autonomous garbage can cart further comprises one or more adaptive inserts that are used to adjust the size of the cavity to match the size of the garbage receptacle. The autonomous garbage can cart further comprises a plurality of wheels driven by a plurality of motors that are controlled by a control module. In a potential embodiment of the disclosure, the remote control system is operated through a personal data device. The autonomous garbage can cart comprises a platform, a plurality of wheels, one or more drive motors, a one or more gearing systems, a control module and a battery.

16 Claims, 5 Drawing Sheets

(56) References Cited

U.S. PATENT DOCUMENTS

| | | | |
|---|---|---|---|
| 8,695,736 B1* | 4/2014 | Samaroo | B65F 1/1452 |
| | | | 180/11 |
| 9,457,823 B2* | 10/2016 | Higbe | B62B 1/264 |
| 2003/0002966 A1 | 1/2003 | Porter | |
| 2007/0209846 A1 | 9/2007 | Wilson | |
| 2009/0008888 A1 | 1/2009 | Boulden | |
| 2017/0129522 A1* | 5/2017 | Lee | B62B 5/0043 |

* cited by examiner

AUTONOMOUS GARBAGE CAN CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of gathering and removing domestic refuse, more specifically, a motorized platform for facilitating the transport of domestic refuse.

SUMMARY OF INVENTION

The autonomous garbage can cart is a remotely operated motorized cart that transports garbage receptacles. The autonomous garbage can cart comprises a platform that is formed with a cavity that is sized to receive garbage receptacles. The autonomous garbage can cart further comprises one or more adaptive inserts that are used to adjust the size of the cavity to match the size of the garbage receptacle. The autonomous garbage can cart further comprises a plurality of wheels driven by one or more drive motors that are controlled by a control module that allows remote control of the autonomous garbage can cart. In a potential embodiment of the disclosure, the remote control system is operated through a personal data device.

These together with additional objects, features and advantages of the autonomous garbage can cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the autonomous garbage can cart in detail, it is to be understood that the autonomous garbage can cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the autonomous garbage can cart.

It is therefore important that the claims be regarded as including such equivalent construction insofar as they do not depart from the spirit and scope of the autonomous garbage can cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
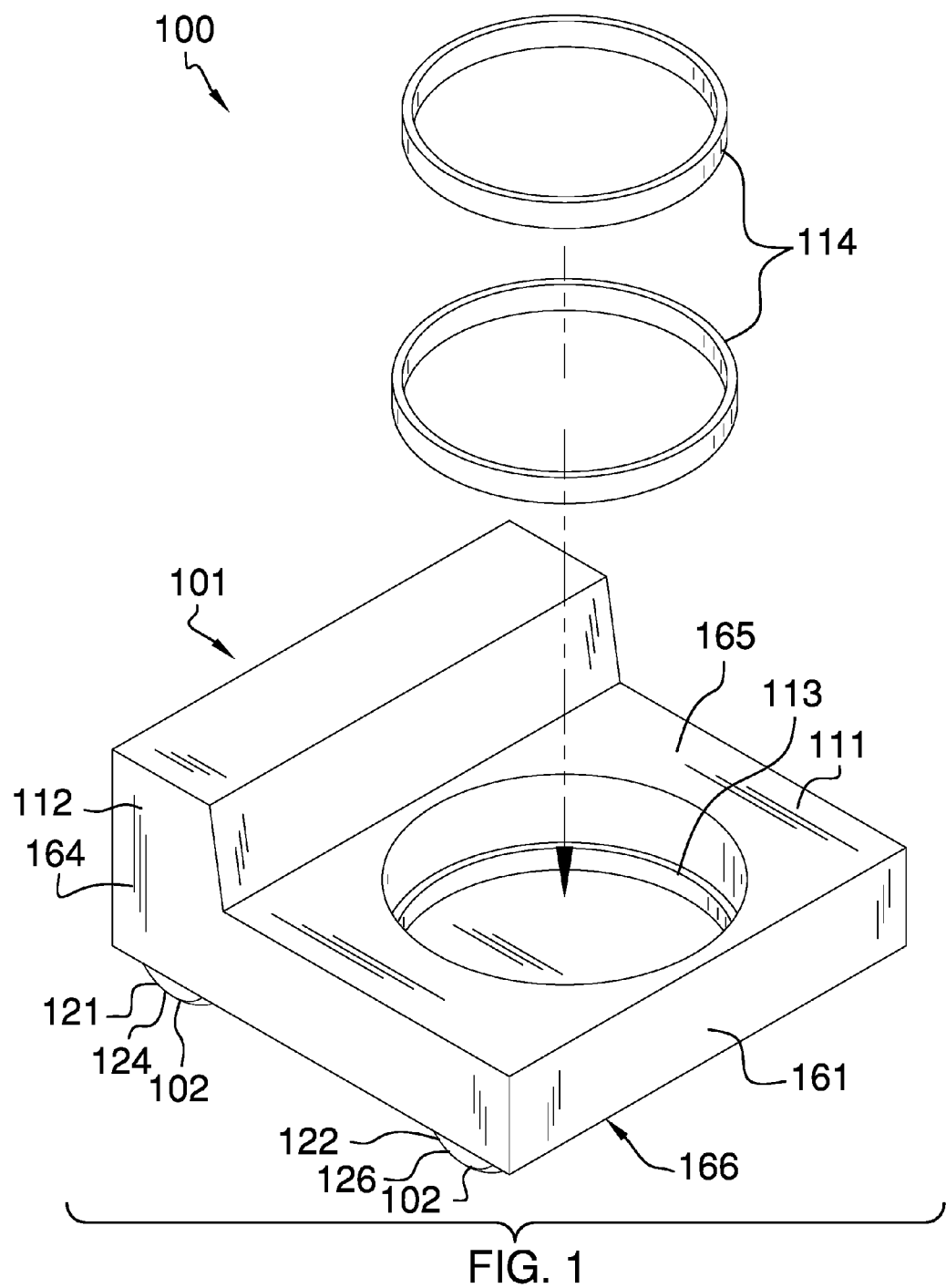
FIG. 1 is a perspective view of an embodiment of the disclosure.
Figure 2:
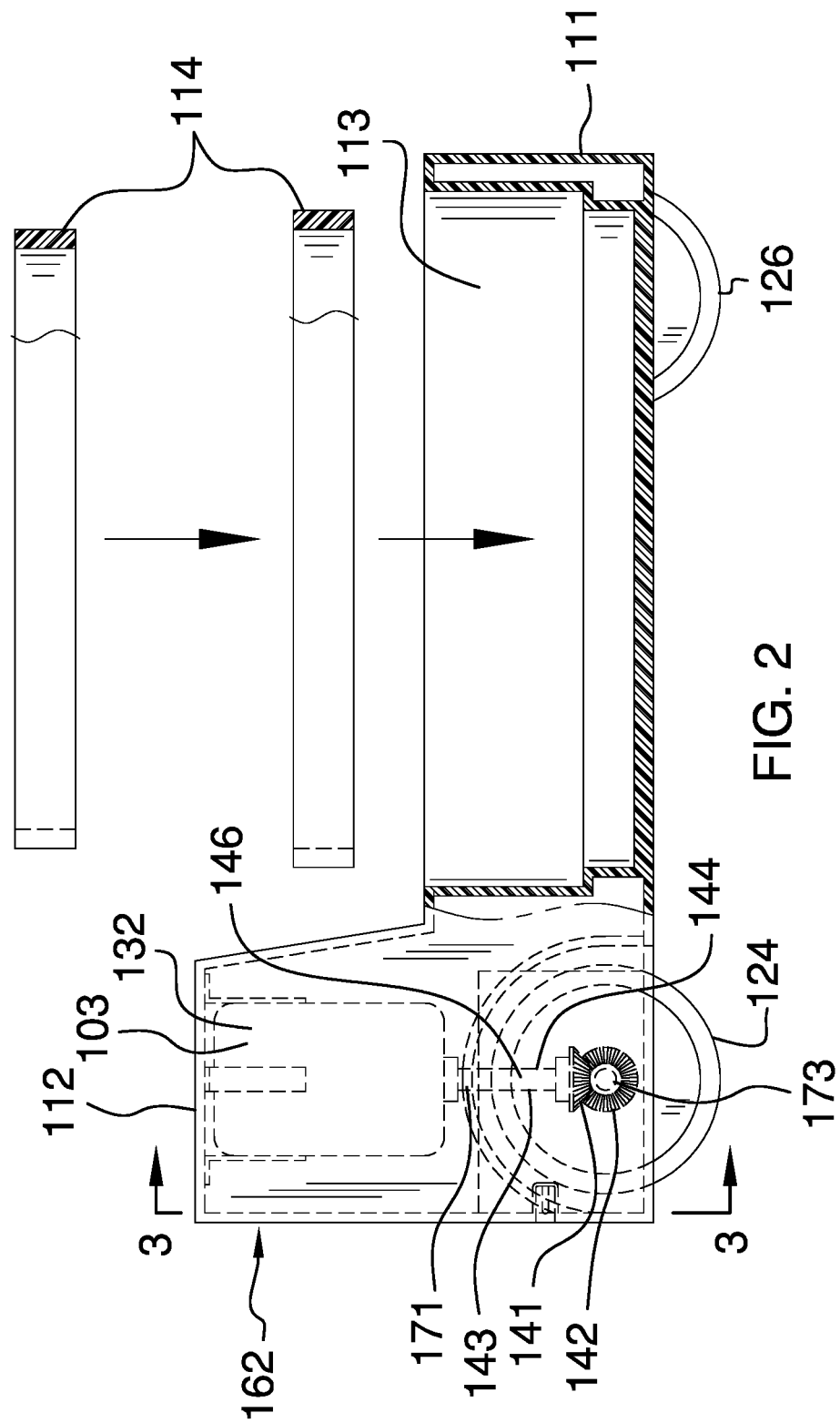
FIG. 2 is a side view of an embodiment of the disclosure.
Figure 3:
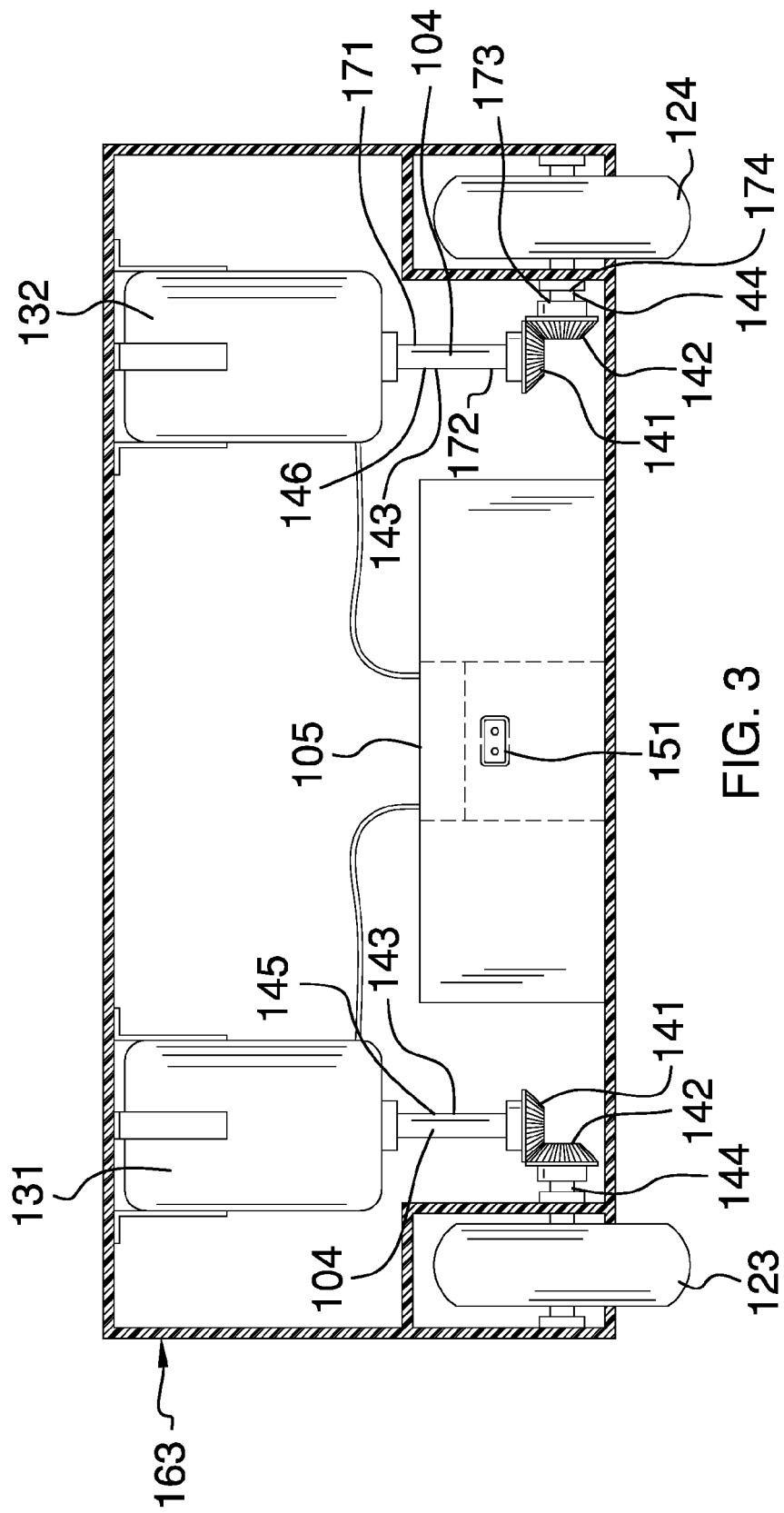
FIG. 3 is a cross-sectional view of an embodiment of the disclosure across 3-3 as shown on FIG. 2.
Figure 4:
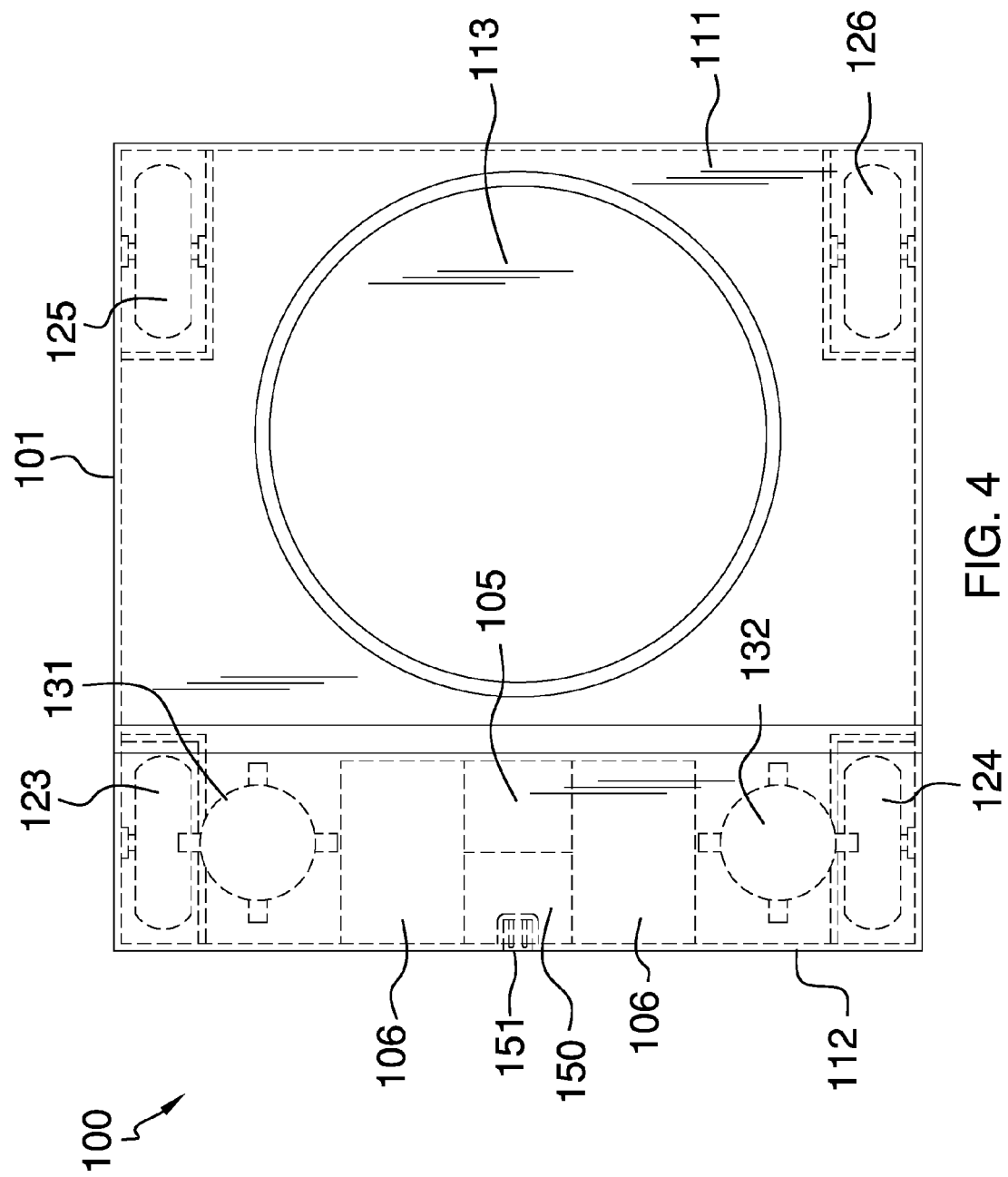
FIG. 4 is a top view of an embodiment of the disclosure.
Figure 5:
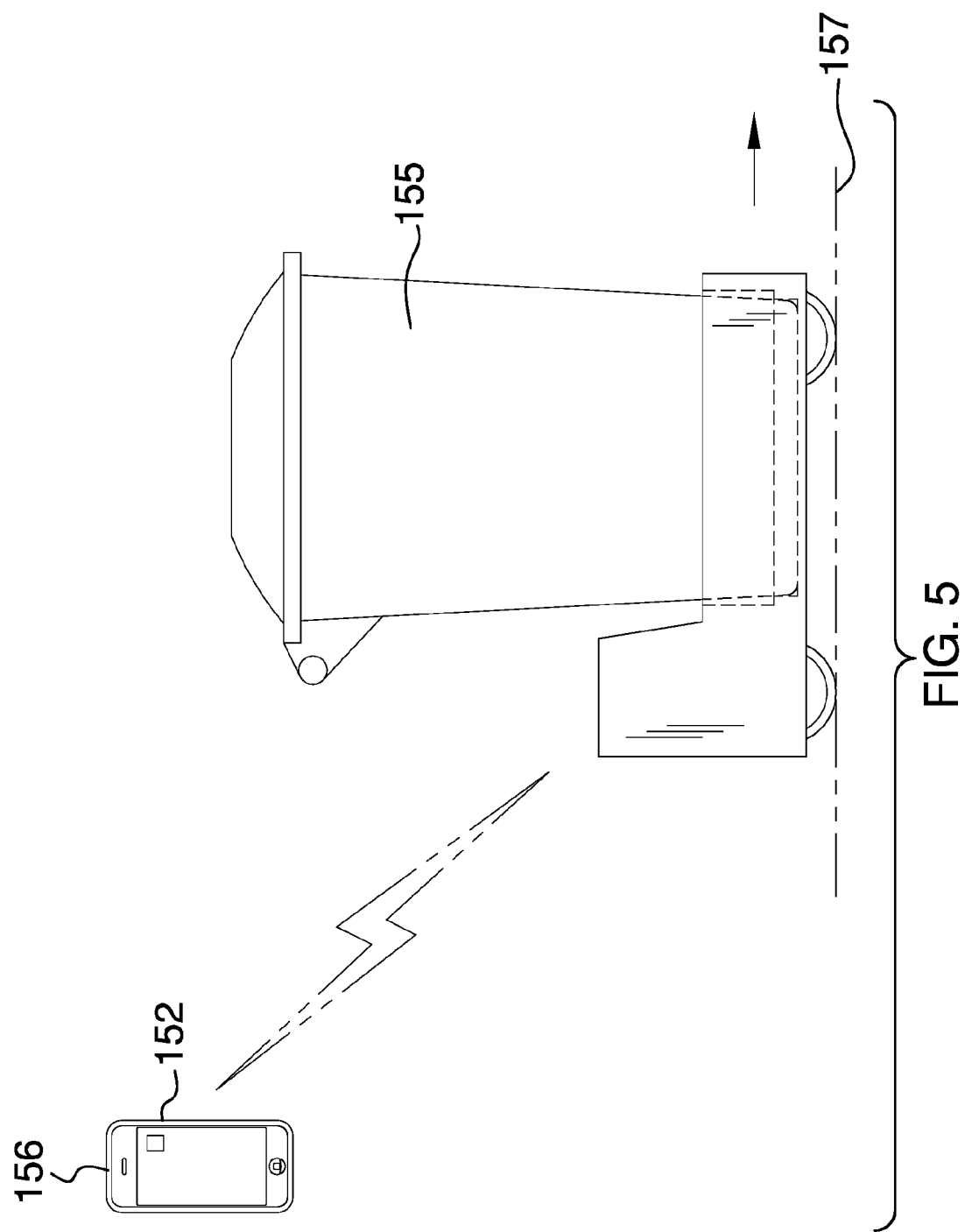
FIG. 5 is an in use view of an embodiment of the disclosure.

Detailed reference will now be made to a first potential embodiment of the disclosure, which is illustrated in FIGS. 1 through 5.

The autonomous garbage can cart 100 (hereinafter invention) comprises a platform 101, a plurality of wheels 102, one or more drive motors 103, a one or more gearing systems 104, a control module 105 and a battery 106.

The invention 100 is a remotely operated motorized cart that transports garbage receptacles 155. The invention 100 comprises a platform 101 that is formed with a cavity 113 that is sized to receive garbage receptacles 155. The invention 100 further comprises one or more adaptive inserts 114 that are used to adjust the size of the cavity 113 to match the size of the garbage receptacle 155. The invention 100 further comprises a plurality of wheels 102 that are driven by one or more drive motors 103 that are controlled by a control module 105 that allows for the remote control of the invention 100. In a potential embodiment of the disclosure, the control module 105 is operated remotely through a personal data device 156.

The platform 101 is the structure upon which the invention 100 is based. The platform 101 further comprises a carriage 111, a housing 112, a cavity 113, and one or more adaptive inserts 114. The platform 101 is further defined by a front side 161, a rear side 162, a left side 163, a right side 164, a top side 165, and a bottom side 166. The bottom side 166 is the surface of the platform 101 that is proximal to the resting surface 157 upon which the invention 100 is placed. The top side 165 is the surface or surfaces that are distal to the bottom side 166. The rear side 162 is the surface of the platform 101 that is proximal to the one or more drive motors and the one or more gearing systems 104. The front side 161 of the platform 101 is the surface or surfaces that are distal to the rear side 162. The intended direction of motion of the invention 100 is from the rear side 162 towards the front side 161 or from the front side 161 towards the rear side 162. When viewing the invention 100 from the rear side 162 towards the front side 161 of the invention 100, the left side 163 of the platform 101 is towards the left side of the viewer. The right side 164 of the invention 100 is the surface of the invention 100 that is distal to the left side 163.

The carriage 111 is the section of the platform 101 upon which a garbage receptacle 155 is placed. The carriage 111 is formed with a cavity 113 that is formed in the shape of a right cylinder in the top side 165 of the carriage 111. As shown most clearly in FIGS. 2 and 5, the inner diameter of the cavity 113 is larger than the outer diameter of a cylindrically shaped garbage receptacle 155 that the invention 100 is designed to receive. As shown most clearly in FIG. 2, each adaptive insert selected from the one or more adaptive inserts 114 are circular bands that are sized such that the selected adaptive insert will fit concentrically within the interior space of the cavity 113 and the interior space of the adaptive inserts remaining in the one or more adaptive inserts 114. When an adaptive insert selected from the one or more adaptive inserts 114 is placed in the cavity 113, the effective interior diameter of the cavity 113 is reduced allowing the cavity 113 to securely hold garbage receptacles 155 of smaller outer diameters. The housing 112 is a rigid chamber that is formed along the rear side 162 of the platform 101. The housing 112 is a protective enclosure which contains the one or more drive motors 103, the one or more gearing systems 104, the control module 105, and the battery 106.

The purpose of the plurality of wheels 102 is to raise the platform 101 above the resting surface 157 and allow the platform 101 to be readily moved. The plurality of wheels 102 further comprises one or more drive wheels 121 and a plurality of idler wheels 122. Each of the one or more drive wheels 121 are connected to a drive motor selected from the one or more drive motors 103 such that the drive motor selected from the one or more drive motors 103 provides the force necessary to rotate the drive wheel to move the invention 100. Each of the plurality of idler wheels 122 is used to raise the platform 101 off the resting surface 157 and to transfer the motion of each of the one or more drive wheels 121 when the invention 100 is in motion. In the first potential embodiment of the disclosure, the one or more drive wheels 121 further comprises a first drive wheel 123 and a second drive wheel 124. The plurality of idler wheels 122 further comprises a first idler wheel 125 and a second idler wheel 126. Each of the plurality of wheels 102 are mounted on the bottom side 166 of the platform 101.

Each of the one or more drive motors 103 is a commercially available electric motor that provides the rotational force necessary to turn at least one, and potentially more than one, of the drive wheels selected from the one or more drive wheels 121. In the first potential embodiment of the disclosure, the one or more drive motors 103 further comprises a first drive motor 131 and a second drive motor 132 wherein the first drive motor 131 drives the first drive wheel 123 and the second drive motor 132 drives the second drive wheel 124. In general, a one to one correspondence need not be maintained between the number of drive motors contained in the set of one or more drive motors 103 and the number of drive wheels contained in the set of one or more drive wheels 121. Methods to design and implement gearing systems that transfer rotational forces to more than one drive wheel are well known and documented in the mechanical arts.

Each of the one or more gearing systems 104 is a transmission device that transfers the rotational energy of a drive motor selected from the one or more drive motors 103 to one or more drive wheels 121 selected from the one or more drive wheels 121. Methods to design gearing systems to transmit energy from electric motors to wheels are well known and documented in the art.

In the first potential embodiment of the invention 100, each of the one or more gearing system 104 further comprises a first bevel gear 141, a second bevel gear 142, a first drive shaft 143 and a second drive shaft 144. The first drive shaft 143 is further defined with a first end 171 and a second end 172. The second drive shaft 144 is further defined with a third end 173 and a fourth end 174. As shown most clearly in FIG. 3, each of the one or more gear systems 104 of the first potential embodiment of the disclosure is assembled as follows. The first end 171 of the first drive shaft 143 is attached to a drive motor selected from the one or more drive motors 103 such that when the drive motor rotates the first drive shaft 143 around the center axis of the first drive shaft 143. The first bevel gear 141 is attached to the second end 172 of the first drive shaft 143. The second bevel gear 142 is attached to the third end 173.

The fourth end 174 of the second drive shaft 144 is attached to the drive wheel selected from the one or more drive wheels 121 that is associated with the drive motor selected from the one or more drive motors 103 such that applied rotation around center axis of the second drive shaft 144 will in turn rotate the drive wheel selected from the one or more drive wheels 121 that is associated with the drive motor selected from the one or more drive motors 103. The drive motor selected from the one or more drive motors 103 is mounted within the housing 112 and the drive wheel selected from the one or more drive wheels 121 is mounted on the platform 101 such that the first bevel gear 141 meshes with the second bevel gear 142. When the operation of a drive motor selected drive motor selected from the one or more drive motors 103 is initiated the rotation of the drive motor will rotate the first bevel gear 141 which in turn rotates the second bevel gear 142 which in turn rotates the drive wheel selected from the one or more drive wheels 121 that is associated with the drive motor selected from the one or more drive motors 103.

In the first potential embodiment of the disclosure, the one or more gearing systems 104 further comprises a first drive gear 145 and a second drive gear 146. The first drive gear 145 is associated with the first drive motor 131 and the first drive wheel 123. The second drive gear 146 is associated with the second drive motor 132 and the second drive wheel 124.

The control module 105 is an electrical device that is used to control the rotation of each drive motor contained within the one or more drive motors 103. Specifically, the control module 105 is module that is mounted with in the housing 112 for the purpose of receiving radio based signals from a remote control terminal 152 and converting the radio based signals from the remote control terminal 152 into electrical control signals that are used to operate each of the one or more drive motors 103. Control modules 105 suitable for these purposes are commercially available. In the first potential embodiment of the disclosure, a remote kit intended for use by hobbyists was adapted and modified without undue experimentation for use as the control module 105 described in this disclosure. Methods to select, install, and operate a control module 105 as described within this disclosure are well known and documented in the electrical arts.

In the first potential embodiment of the disclosure, the selected control module 105 supported receiving the radio based signals used to remotely control the invention 100 from a personal data device 156 over a Bluetooth connection. This functionality was incorporated into the first potential embodiment of the disclosure.

The battery 106 is mounted within the housing 112. The battery 106 converts chemical energy into electric energy suitable for use by the one or more drive motors 103 and the control module 105. The battery 106 further comprises a charging port 151 and charging system 150 that allows the battery 106 to be recharged.

When in use, the invention 100 operates in a manner analogous to the operation of a commercially available remotely controlled land vehicle. Specifically, In the first potential embodiment of the disclosure, the platform 101 is made from molded plastic in a mold comprising a plurality of platform 101 components that are subsequently assembled. The remaining components discussed in this disclosure are commercially available.

The following definitions were used in this disclosure:

Battery: As used in this disclosure, a battery is a container consisting of one or more cells, in which chemical energy is converted into electricity and used as a source of power.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Cylinder: As used in this disclosure, a cylinder is a geometric solid defined by two identical flat and parallel ends that are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Electric Motor: In this disclosure, an electric motor is a machine that converts electric energy into rotational mechanical energy.

Inner Diameter: As used in this disclosure, the term inner diameter is used in the same way that a plumber would refer to the inner diameter of a pipe.

Motor: As used in this disclosure, a motor refers to the method of transferring energy from the external power source into mechanical energy.

Outer Diameter: As used in this disclosure, the term outer diameter is used in the same way that a plumber would refer to the outer diameter of a pipe.

Personal Data Device: As used in this disclosure, a personal data device is a handheld device that is used for managing personal information and communication. Examples of personal data device include, but are not limited to, cellular phones, tablets and smart phones.

Remote Control: As used in this disclosure, remote control means the establishment of control of a device from a distance. Remote control is generally accomplished through the use of an electrical device that generates electrically based control signals that are transmitted via radio frequencies or other means to the device.

Wheel: As used in this disclosure, a wheel is a circular object that revolves around an axle or an axis and is fixed below an object to enable it to move easily over the ground.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A conveyance device comprising:
   a platform, a plurality of wheels, one or more drive motors, one or more gearing systems, a control module, and a battery;
   wherein the conveyance device is a remotely operated motorized cart;
   wherein the conveyance device is adapted for use with garbage receptacles;
   wherein the conveyance device transports garbage receptacles;
   wherein the platform further comprises a carriage, a housing, a cavity, and one or more adaptive inserts;
   wherein the carriage is further defined by a front side, a rear side, a left side, a right side, a top side, and a bottom side;
   wherein the carriage is formed with the cavity that is formed in the shape of a right cylinder in the top side of the carriage;
   wherein an inner diameter of the cavity is larger than an outer diameter of the garbage receptacle;
   wherein each adaptive insert selected from the one or more adaptive inserts are circular bands;
   wherein each adaptive insert selected from the one or more adaptive inserts are sized such that the selected adaptive insert will fit concentrically within an interior space of the cavity;
   wherein each adaptive insert selected from the one or more adaptive inserts are sized such that the selected adaptive insert will fit concentrically within the interior space of the adaptive inserts remaining in the one or more adaptive inserts when more than one adaptive insert is provisioned.

2. The conveyance device according to claim 1
   wherein the housing is a chamber that is formed along the rear side of the platform;
   wherein the housing contains the one or more drive motors, the one or more gearing systems, the control module, and the battery.

3. The conveyance device according to claim 2 wherein the plurality of wheels further comprises one or more drive wheels and a plurality of idler wheels.

4. The conveyance device according to claim 3 wherein each of the one or more drive wheels are connected to a drive motor selected from the one or more drive motors.

5. The conveyance device according to claim 4 wherein each of the one or more drive motors is an electric motor.

6. The conveyance device according to claim 5 wherein each of the one or more gearing systems is a transmission device that transfers a rotational energy of a drive motor selected from the one or more drive motors to one or more drive wheels selected from the one or more drive wheels.

7. The conveyance device according to claim 6 wherein the control module is an electrical device that controls a rotation of each drive motor contained within a set of one or more drive motors.

8. The conveyance device according to claim 7 wherein the control module receives radio based signals from a remote control terminal, which converts the radio based signals from the remote control terminal into electrical control signals that are used to operate each motor selected from the one or more drive motors.

9. The conveyance device according to claim 8
wherein the each of the one or more gearing systems further comprises a first bevel gear, a second bevel gear, a first drive shaft and a second drive shaft;
wherein the first drive shaft is further defined with a first end and a second end;
wherein the second drive shaft is further defined with a third end and a fourth end.

10. The conveyance device according to claim 9
wherein the first end of the first drive shaft is attached to a drive motor selected from the one or more drive motors such that when the drive motor rotates the first drive shaft around a center axis of the first drive shaft;
wherein the first bevel gear is attached to the second end of the first drive shaft;
wherein the second bevel gear is attached to the third end of the second drive shaft;
wherein the fourth end of the second drive shaft is attached to the drive wheel selected from the one or more drive wheels that is associated with the drive motor selected from the one or more drive motors such that applied rotation around a center axis of the second drive shaft will in turn rotate the drive wheel selected from the one or more drive wheels that is associated with the drive motor selected from the one or more drive motors.

11. The conveyance device according to claim 10 wherein the first bevel gear meshes with the second bevel gear.

12. The conveyance device according to claim 11 wherein the one or more gearing systems further comprises a first drive gear and a second drive gear.

13. The conveyance device according to claim 12 wherein the one or more drive wheels further comprises a first drive wheel and a second drive wheel.

14. The conveyance device according to claim 13 wherein the plurality of idler wheels further comprises a first idler wheel and a second idler wheel.

15. The conveyance device according to claim 14 wherein the one or more drive motors further comprises a first drive motor and a second drive motor.

16. The conveyance device according to claim 8 wherein the remote control terminal is a personal data device.

* * * * *